Patented Jan. 2, 1945

2,366,589

UNITED STATES PATENT OFFICE 2,366,589

PROCESS FOR PREPARING A POLYHYDRIC ALCOHOL ESTER OF PURIFIED HYDROGENATED ROSIN

Joseph N. Borglin, Wilmington, Del., assignor to Hercules Powder Company, Wilmington, Del., a corporation of Delaware No Drawing. Application February 6, 1941, Serial No. 377,653

8 Claims. (Cl. 260—100)

This invention relates to a process for preparing a polyhydric alcohol ester of purified hydrogenated rosin.

In the copending application of J. M. Schantz, Serial No. 340,472, filed June 14, 1940, there is described and claimed the use of a polyhydric alcohol ester of hydrogenated rosin in chewing gum. The manufacturer of chewing gum in accordance witth the teaching of that application is not altogether satisfactory because the resulting chewing gum frequently displays an objectionable stickiness especially upon prolonged chewing. Moreover, the use of the polyhydric alcohol esters of hydrogenated rosin such as for example, the glycerine ester, frequently imparts to the chewing gum a noticeable bitterness.

It is an object of the present invention to prepare chewing gum embodying a polyhydric alcohol ester of hydrogenated rosin which overcomes the disadvantages referred to above. Another object is to prepare a chewing gum embodying the glycerine ester of hydrogenated rosin and free from those disadvantages. Still another object is to treat the resinous constituent of chewing gums of the type referred to above so as to free it from any tendency to impart to the resulting chewing gum stickiness or bitterness. Numerous other objects will more fully hereinafter appear.

I have discovered that the foregoing objects may be accomplished when the polyhydric alcohol ester of hydrogenated rosin such as the glycerine ester is freed from unesterified neutral bodies prior to its incorporation into the chewing gum material.

If the hydrogenated rosin from which the ester is prepared is treated so as to remove the neutral bodies therefrom prior to esterification, the resulting ester imparts no objectionable stickiness or bitterness to the chewing gum. To accomplish this, the hydrogenated rosin may be treated by an extraction process so as to recover only the hydrogenated acidic bodies therein.

Thus, I may dissolve the hydrogenated rosin in a water-miscible organic solvent such as ethyl alcohol, acetone, methyl alcohol, etc., neutralize this solution with an aqueous solution of an alkali in order to form the alkali soaps of hydrogenated rosin acids present, and extract the neutralized mixture with a water-immiscible organic solvent which is a solvent of all of the bodies initially present in the hydrogenated rosin and which therefore extracts the non-acid material therefrom. This solvent may be a petroleum distillate such as gasoline, petroleum ether, etc. I then acidify the raffinate or extracted solution so as to liberate the free hydrogenated rosin acids, extract this acidified mixture with a water-immiscible solvent for hydrogenated rosin such as a petroleum distillate such as gasoline, petroleum ether, etc., and evaporate the solvent from the extract solution to recover the purified hydrogenated rosin which is free from non-acid materials. The thus recovered purified hydrogenated rosin may then be esterified with the polyhydric alcohol such as glycerine and the resulting ester used in chewing gum.

Instead of the foregoing method of preparing the polyhydric alcohol ester of hydrogenated rosin, I may extract the hydrogenated rosin acids from ordinary hydrogenated rosin by the borax extraction method of the copending application of R. F. Cox, Serial No. 381,779, filed March 5, 1941, whereby there is obtained a hydrogenated rosin of high melting point and high freedom from neutral bodies, and esterify the resulting resin with glycerine or the like to yield a resin which gives an improved chewing gum. Briefly the method of that application involves forming an ether solution of the hydrogenated rosin, extracting this ether solution with 5% aqueous borax, extracting the borax extract with ether and evaporating to recover the hydrogenated rosin acids.

Instead of the foregoing extraction methods, I may employ any other process which yields a glycerine ester of hydrogenated rosin having a melting point above 90° C., an acid number below 35 and a content of unesterified neutral bodies less than 5%, such as by sparging the hydrogenated rosin or the glycerine ester thereof under reduced pressure with steam, carbon dioxide, or other gas at high temperature for long periods of time, or distillation of the hydrogenated rosin or the glycerine ester thereof under reduced pressure until the content of unesterifiable materials or unesterified neutral bodies is reduced sufficiently to give an ester containing less than 5% and preferably less than 1% of unesterified neutral bodies. I prefer to treat both the hydrogenated rosin and the ester thereof by this method. In general, however, the extraction procedures outlined above, and particularly the extraction procedure first described, are preferred. If desired, the purified hydrogenated rosin prepared by an extraction process as described above may be esterified with glycerine or the like and the ester treated by sparging or distillation under reduced pressure to remove any traces of unesterified neutral bodies or volatiles therein.

I use the polyhydric alcohol ester of hydrogenated rosin which is at least 50% saturated. I may esterify hydrogenated rosin the saturation figure of which varies from 50% to 100% of the theoretical for two double bonds.

The glycerine ester of hydrogenated rosin employed in the formulation of the chewing gum in accordance with the present invention should have a melting point above 90° C., an acid number not over about 35 and preferably not over about 10 and a content of unesterified neutral bodies less than about 5% and preferably less than about 1%. The use of a product of low acid number is particularly desirable in order to avoid imparting any appreciable taste to the chewing gum.

By following the principles outlined above, there is obtained an ester which has a melting point substantially above the melting point of the corresponding polyhydric alcohol ester of hydrogenated rosin produced by the conventional methods. Thus, the melting point of the resinous product is above 90° C. as determined by the Hercules drop method.

While methods of formulating chewing gum embodying the resinous ester prepared as described above will be obvious to those skilled in the art and will vary considerably depending upon the particular manufacture, for the sake of completeness it is deemed desirable to set forth below principles of formulating a chewing gum base therewith.

The polyhydric alcohol ester of hydrogenated rosin is preferably admixed with a rubber-like material such as gum chicle or substitutes therefor, such as crepe rubber, rubber latex, guayule rubber, gutta percha, gutta siak, jelutong, pontianak, balata, factice, etc. Natural rubber either as such or in the form of an aqueous dispersion such as rubber latex may be employed as the rubbery or rubber-like constituent of the chewing gum base. Synthetic rubber and latices made therewith may be used. It is preferred to use so-called synthetic chicle, that is low grade natural vegetable rubber-like materials too high in resin content (resin content ranging from about 25% and usually from about 40% to about 90%) to be useful for rubber, such as materials selected from the group consisting of gutta percha, jelutong, balata, gum tuno, namaqualand rubber, almeidana gum, abba rubber, and inferior guttas such as gutta siak, gutta cotie, gutta kay, gutta hangkang, gutta jangkar, gutta sundik, gutta soh, gutta susu, gutta penang, yellow gutta and related materials and mixtures of the foregoing materials with one another and with gum chicle. The polyhydric alcohol esters of hydrogenated rosin are completely miscible with the rubber-like materials named. Instead of using a single rubber-like material mixtures of two or more thereof may be employed. Preferably, the rubbery component is employed in an amount such as to yield a ratio to the resinous ester ranging from about 20 to 1 to about 1 to 10 and preferably from about 2 to 1 to about 1 to 2.5. Equal parts by weight of the rubber-like material and the polyhydric alcohol ester of hydrogenated rosin form a particularly desirable chewing gum base.

In addition to the rubbery material and the resinous ester, the chewing gum base may if desired, embody other resins, synthetic or natural, such as ordinary rosin, ordinary ester gum, cumarone resin, pontianak resin, copal gum, kauri gum, dammar gum, sweet bay gum, spruce gum, balsams and the like. It is preferred to keep the percentages of such other resins at a minimum in view of the fact that they have a tendency when used in large amounts to impart objectionable characteristics to the chewing gum.

There may be incorporated with the materials making up the chewing gum base an oily softening agent such as petrolatum, beef stearin, vegetable oil such as cottonseed oil, olive oil, etc., petroleum oil such as water-white mineral oil or the like or hydrogenated vegetable oil such as hydrogenated cottonseed oil which is preferably solid at ordinary temperature, etc. The oily softening agent should be present in limited amount, say not over 25% of the chewing gum base so as to impart no objectionable oily characteristic to the chewing gum.

It is frequently desirable to incorporate in the composition a wax or wax-like material such as paraffin wax, beeswax, stearic acid, candelilla wax, ceresin wax, etc. The amount of wax employed may vary up to about 25% of the chewing gum base. If desired, however, the wax content may be as high as say 50-75% by weight.

The components of the chewing gum base are intermixed with one another in any manner which gives a homogeneous intimate mixture. The rubbery material and the resinous ester may be admixed with each other by heating them together to a temperature at which they are fluent with stirring and maintenance of the temperature until a homogeneous mixture is obtained. If other components are employed such as resins other than the resinous ester of the present invention, a waxy material, or an oily softening agent, such other components may be commingled with the principal ingredients in the same manner. It has been found to be particularly advantageous to effect the intermixture by working the mixture on a roll mill at temperatures below the melting point of either the resinous or the rubbery ingredients, passing it through the rolls a number of times until the desired intermixture is effected.

Where a waxy material and an oily softening agent are employed, admixture may be effected by heating the oily softening material with the waxy material to an elevated temperature whereupon the rubbery material and the resinous ester are stirred into the hot mixture until it is uniform.

Where a large proportion of waxy material is employed, it has been found to be advantageous to first mix the waxy material with the solid rubber-like component and heat to an elevated temperature until the waxy component is molten, stirring and maintaining the temperature until a homogeneous mass is obtained whereupon the resinous component and any other desired components are introduced into the mixture.

It is frequently desirable to incorporate small amounts of water in the composition, this being particularly desirable where the rubbery or rubber-like material is in solid form. The admixture of water in this manner produces a mellowing and softening effect on the gum. The amount of water incorporated in this manner may vary up to say 10% of the chewing gum base where the rubber-like material is in solid form. Where an aqueous dispersion of the rubbery component is employed there may be incorporated as much as 30% or 40% by weight of water in the composition. Similar large amounts of water may, if desired, be used where the rubbery component is solid.

Ordinarily, the amount of water left in the final chewing gum base will not exceed 5 or 10%. Water in such amounts is frequently very advantageous because of the desirable consistency and ease of manufacture into the final gum which it imparts to the chewing gum base.

The hot chewing gum base prepared as described above may be allowed to cool and the softening and flavoring ingredients incorporated subsequently in any desired manner. Alternatively, the flavoring and sweetening substituents may be added to the chewing gum base while it is still hot. There may be employed as sweetening agents the usual mixture of powdered sugar and glucose syrup or other agents such as invert sugar, levulose, saccharin, etc. As the flavoring constituents, there may be employed the usual ingredients such as oil of peppermint, spearmint, wintergreen, etc., licorice, vanilla, vanillin, etc. Where gum chicle is not present in the mixture, dry cocoa powder or cocoa syrup may be employed.

There may be incorporated in the mixture small amounts of a suitable filler material such as clay, calcium carbonate, magnesium carbonate, magnesium oxide, barium sulfate, calsium sulfate, carbon black, activated carbon, medicating agents such as phenol phthalein, mannitol, etc.

As the polyhydric alcohol which is esterified with the hydrogenated rosin, I prefer to employ those polyhydric alcohols having at least three carbon atoms and at least three hydroxyl groups and not more than six carbon atoms and not more than six hydroxyl groups such as glycerine, erythritol, pentaerythritol, xylitol, adonitol, arabitol, sorbitol, mannitol, dulcitol, iditol, talitol, trimethylol methane, butantriol-1, 2, 3, pentaglycerol, rhamnitol, inner ethers of the hexahydric alcohols such as mannitan, sorbitan, dulcitan, etc. Such esters are preferred because of their high melting point and the non-toxic nature of the esters and the alcohols. However, other polyhydric alcohol esters may be used such as the glycol esters although on account of the softness of the glycol esters and the reported toxicity of certain of the glycols, such esters are not preferred. I may use esters of still higher polyhydric alcohols such as perseitol, lactositol, volemnitol, enneaheptite, etc. I may use esters with other non-toxic saturated aliphatic compounds having a plurality of hydroxy groups such as glucose, sucrose, the dihydroxyl inner ether derivatives of the hexahydric alcohols such as mannide, sorbide, dulcide, etc., non-toxic polyhydroxy carboxylic acids such as glyceric acid, gluconic acid, tartaric acid, trihydroxy glutaric acid, tetrahydroxy adipic acid, mucic acid, saccharic acid, etc.

Following are examples showing the preparation of a highly purified ester by highly purifying the hydrogenated rosin prior to esterification. In Example 3, the ester was also purified.

Example 1

Fifteen hundred g. of hydrogenated rosin (saturation 60%, acid number 161, drop melting point 79° C. and color of 5 amber or an X grade) were dissolved in 6 liters of denatured ethyl alcohol (formula 2B). To this solution there was added with stirring 188 g. of NaOH in 6 liters of water (somewhat more than sufficient to effect complete neutralization). The neutralized mixture was extracted 6 times with 1 liter of petroleum ether per extraction. The extracted solution was then acidified with 2300 g. of 10% $H_2SO_4$. The acidified solution was extracted with 6 lots of 1 liter of petroleum ether. The petroleum ether extract was washed with water and all volatiles distilled off. The resinous residue consisted of the purified hydrogenated rosin acids. This resinous residue was esterified by heating with 13½% of its weight of glycerine for 18 hours at 270–280° C. with a hot water reflux condenser. When the acid number reached 4, the mixture was sparged with $CO_2$ for 9 hours to remove excess glycerine. The rate of esterification was considerably decreased by the removal of the non-acid materials from the hydrogenated rosin. The resulting ester had a color of 30 amber, an acid number of 3.8, a drop melting point of 91° C. and a volatile oil content of 0.005%.

Example 2

Two hundred and fifty parts by weight of the same hydrogenated rosin as was used in Example 1 was dissolved in 700 parts by weight of ethyl ether, and extracted with 1000 parts of 5% aqueous borax solution. The borax solution was then extracted with 700 parts of ether. This procedure was repeated twenty-three times. The hydrogenate dresin acids were isolated by evaporation of the ether extract and analyzed; drop melting point 83.7° C., acid number 174.0, saponification number 176.7 and thiocyanogen number 28.0. This hydrogenated rosin was esterified with glycerine in exactly the same manner as in Example 1. The resulting ester had a color of 26 amber, an acid number of 2.0, and a drop melting point of 96° C.

Example 3

Five hundred parts by weight of the same hydrogenated rosin as was used in Examples 1 and 2 was maintained at a temperature of 100–120° C. and sparged with steam which had been passed through a gas fired superheater. The steam was at a temperature of about 180° C. This treatment was continued for one hour. The product had a melting point of 80–81° C., an acid number of 164, and a color of 10 amber. The product was mixed with 13% of its weight of glycerine and the mixture heated for 18 hours at 270–280° C. The ester was then sparged with steam at 280–290° C. for two hours. The resulting ester had an acid number of 3, a melting point of 90.5° C. and a color of 30 amber.

Below are given specific examples showing the formulation of chewing gum bases in accordance with the present invention.

Example 4

| | Parts by weight | Per cent by weight |
| --- | --- | --- |
| Crepe rubber | 25 | 23.8 |
| Gum chicle | 25 | 23.8 |
| Glycerin ester of purified hydrogenated rosin (product of Example 1) | 25 | 23.8 |
| Hydrogenated cottonseed oil ("Crisco") | 15 | 14.3 |
| Stearic acid | 15 | 14.3 |

The stearic acid and the hydrogenated cottonseed oil were melted together and heated to 150° C. whereupon the rubber was slowly added in small portions with stirring and the temperature of the mixture gradually raised to 160° C. The gum chicle was added and the mixture stirred until uniform. Then the resin was added, the mixture again stirred until uniform and poured into a mold to cool. There was obtained a plastic mass which was highly resistant to deterioration upon ageing and which when sweetened and flavored yielded a chewing gum having very desirable chewing characteristics and good retention of physical properties and flavor. It was free of undesirable flavors.

*Example 5*

|  | Parts by weight | Per cent by weight |
| --- | --- | --- |
| Paraffin (M. P. 125° F.) | 100 | 63.0 |
| Crepe rubber | 20 | 13.6 |
| Glycerine ester of purified hydrogenated rosin (product of Example 2) | 12 | 8.1 |
| Coumarone resin | 6 | 4.1 |
| Beeswax | 6 | 4.1 |
| Water | 3 | 2.1 |

The paraffin was melted and the rubber was then added. This mixture was slowly heated to 135° C. at which temperature the mix became uniform. Then the temperature was slowly raised to 145–150° C. whereupon the resins and the beeswax were added, the mixture stirred until uniform and allowed to cool. When the temperature had dropped to 95–100° C., the water was stirred in and the mixture poured into a mold and allowed to cool. A light colored material free of undesirable flavors and with good chewing qualities was obtained.

*Example 6*

| | Parts by weight |
| --- | --- |
| Rubber latex (40% rubber) | 40 |
| Water | 40 |
| Purified glycerine ester of purified hydrogenated rosin (product of Example 3) | 40 |
| Stearic acid | 25 |
| Hydrogenated cottonseed oil ("Crisco") | 25 |
| Cocoa powder | 7 |

The materials were mixed thoroughly at room temperature, and then heated slowly at 100–115° C. with stirring and maintenance at this temperature until all of the water and latex preservative (ammonia and formaldehyde) had been driven off. The time required was about one hour. The hot mixture was then poured into a mold and allowed to cool. The chewing gum obtained exhibited a rubbery characteristic similar to gum chicle, but was free of undesirable flavors.

It will be understood that the details and examples hereinbefore set forth are illustrative only and that the invention as broadly described and claimed is in no way limited thereby.

What I claim and desire to protect by Letters Patent is:

1. The process of preparing a glycerine ester of hydrogenated rosin comprising dissolving hydrogenated rosin in a water-miscible organic solvent, neutralizing the solution with an aqueous solution of an alkali, extracting the neutralized mixture with a water-immiscible organic solvent, acidifying the extracted solution, extracting the acidified mixture with a water-immiscible organic solvent for hydrogenated rosin, evaporating the solvent from the extract to recover the purified hydrogenated rosin, and esterifying the recovered purified hydrogenated rosin with glycerine to form an ester having an acid number of not over about 10.

2. The process of preparing a polyhydric alcohol ester of hydrogenated rosin of reduced stickiness, improved taste, and increased melting point, which comprises dissolving hydrogenated rosin in a water-miscible organic solvent, neutralizing the solution with an aqueous solution of an alkali, extracting the neutralized mixture with a water-immiscible organic solvent, acidifying the extracted solution, extracting the acidified mixture with a water-immiscible organic solvent for hydrogenated rosin, evaporating the solvent from the extract to recover hydrogenated rosin acids, and esterifying the recovered hydrogenated rosin acids with a polyhydric alcohol having at least three carbon atoms and at least three hydroxyl groups and not more than six carbon atoms and not more than six hydroxyl groups to form an ester having an acid number of not over about 10.

3. A process as set forth in claim 2 in which the ester is treated by sparging under reduced pressure, thereby removing traces of unesterified neutral bodies or volatiles therefrom.

4. A process as set forth in claim 2 in which the ester is subjected to distillation under reduced pressure thereby removing traces of unesterified neutral bodies or volatiles therefrom.

5. The process of preparing a pentaerythritol ester of hydrogenated rosin of reduced stickiness, improved taste, and increased melting point which comprises dissolving hydrogenated rosin in a water-miscible organic solvent, neutralizing the solution with an aqueous solution of an alkali, extracting the neutralized mixture with a petroleum distillate solvent, acidifying the extracted solution, extracting the acidified mixture with a petroleum distillate solvent, evaporating the solvent from the extract to recover hydrogenated rosin acid, and esterifying the recovered hydrogenated rosin acids with pentaerythritol to form an ester having an acid number of not over about 10.

6. The process of preparing a polyhydric alcohol ester of hydrogenated rosin of reduced stickiness, improved taste, and increased melting point, which comprises dissolving hydrogenated rosin in ethyl alcohol, neutralizing the solution with an aqueous solution of an alkali, extracting the neutralized mixture with a petroleum distillate solvent, acidifying the extracted solution, extracting the acidified mixture with a petroleum distillate solvent, evaporating the solvent from the extract to recover hydrogenated rosin acids, and esterifying the recovered hydrogenated rosin acids with a polyhydric alcohol to form an ester having an acid number of not over about 10.

7. The process of preparing a polyhydric alcohol ester of hydrogenated rosin of reduced stickiness, improved taste, and increased melting point, which comprises dissolving hydrogenated rosin in acetone, neutralizing the solution with an aqueous solution of an alkali, extracting the neutralized mixture with a gasoline solvent, acidifying the extracted solution, extracting the acidified mixture with gasoline, evaporating the solvent from the extract to recover hydrogenated rosin acids, and esterifying the recovered hydrogenated rosin acids with a polyhydric alcohol thereby forming an ester having an acid number of not over about 10.

8. In a process for the preparation of a polyhydric alcohol resinous ester of minimum taste, decreased stickiness, and increased melting point, in comparison with a similar ester of hydrogenated rosin, comprising treatment modifying the properties of hydrogenated rosin followed by esterification with a polyhydric alcohol, the steps of dissolving hydrogenated rosin in a water-miscible organic solvent, neutralizing the solution with an aqueous solution of an alkali, extracting the neutralized mixture with a water-immiscible organic solvent, acidifying the extracted solution, extracting the acidified mixture with a water-immiscible organic solvent for hydrogenated rosin, and evaporating the solvent from the extract to recover hydrogenated rosin acids.

JOSEPH N. BORGLIN.